US010400684B2

(12) United States Patent
Kuroiwa et al.

(10) Patent No.: US 10,400,684 B2
(45) Date of Patent: Sep. 3, 2019

(54) ENGINE-DRIVEN WORKING MACHINE

(71) Applicant: YAMABIKO CORPORATION, Tokyo (JP)

(72) Inventors: Minoru Kuroiwa, Tokyo (JP); Ryota Yokouchi, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 452 days.

(21) Appl. No.: 15/287,764

(22) Filed: Oct. 7, 2016

(65) Prior Publication Data

US 2017/0101943 A1 Apr. 13, 2017

(30) Foreign Application Priority Data

Oct. 13, 2015 (JP) ................................ 2015-202335

(51) Int. Cl.

*B60W 10/08* (2006.01)
*F02D 31/00* (2006.01)
*B25F 5/00* (2006.01)
*B27B 17/08* (2006.01)
*F02B 63/02* (2006.01)

(Continued)

(52) U.S. Cl.

CPC ............ *F02D 31/002* (2013.01); *B25F 5/001* (2013.01); *B27B 17/08* (2013.01); *F02B 63/02* (2013.01); *F02D 31/001* (2013.01); *F02D 41/0097* (2013.01); *F02D 41/06* (2013.01); *F02N 15/10* (2013.01); *F02D 2400/06* (2013.01); *F02D 2700/02* (2013.01)

(58) Field of Classification Search

CPC ............................ B60W 10/08; F02D 31/009

See application file for complete search history.

(56) References Cited

U.S. PATENT DOCUMENTS 7,171,942 B2 * 2/2007 Nickel .................. F02D 31/001 123/335
7,699,039 B2 4/2010 Carlsson et al.

(Continued)

FOREIGN PATENT DOCUMENTS

EP 2693022 A1 2/2014
WO 2009085006 A1 7/2009

OTHER PUBLICATIONS

Extended European Search Report issued in corresponding European Patent Application No. 16193767.7 dated Mar. 27, 2017 (6 pages).

*Primary Examiner* — Tisha D Lewis

(74) *Attorney, Agent, or Firm* — Kilyk & Bowersox, P.L.L.C.

(57) ABSTRACT

To satisfy both a request for ensuring worker's safety at the engine start and a worker's request for promptly starting a work, on the premise of a working machine including an engine RPM suppression mode. A working machine (1) has a centrifugal clutch (6). The engine RPM suppression mode is executed at the start of an internal combustion engine (2). With the RPM suppression mode, the RPM of the internal combustion engine (2) is controlled not to exceed a clutch-in RPM. The working machine (1) has a mode cancelling means (S5) canceling the engine RPM suppression mode when a predetermined mode cancelation condition for cancelling the engine RPM suppression mode is satisfied, and a cancellation condition changing means (S2) changing the mode cancelation condition depending on a change in an engine operational state and/or an environment.

14 Claims, 11 Drawing Sheets

(51) Int. Cl.

| | |
|---|---|
| ***F02N 15/10*** | (2006.01) |
| ***F02D 41/00*** | (2006.01) |
| ***F02D 41/06*** | (2006.01) |

(56) References Cited

U.S. PATENT DOCUMENTS

| | | | | |
|---|---|---|---|---|
| 9,322,329 | B2 * | 4/2016 | Gegg | F02D 31/009 |
| 9,759,176 | B2 * | 9/2017 | Mezaki | B27B 17/083 |
| 2009/0193669 | A1 * | 8/2009 | Gorenflo | B27B 17/083<br>30/382 |
| 2012/0193112 | A1 | 8/2012 | Gwosdz et al. | |
| 2014/0034011 | A1 | 2/2014 | Gegg et al. | |

* cited by examiner

ENGINE-DRIVEN WORKING MACHINE

BACKGROUND OF THE INVENTION

The present invention relates to an engine-driven working machine.

Engine-driven working machines have been known, such as a chain saw, a brush cutter, and a hedge trimmer.

The working machine includes: an internal-combustion engine having a carburetor; an operating unit (e.g., a chain with cutters in the case of the chain saw); and a centrifugal clutch disposed between the internal-combustion engine and the operating unit. The centrifugal clutch becomes engaged when the internal-combustion engine RPM is higher than a predetermined clutch-in RPM, transmitting rotations of the internal-combustion engine to the operating unit. On the contrary, when the engine RPM is lower than the clutch-in RPM, the centrifugal clutch becomes disengaged, interrupting coupling between the internal-combustion engine and the operating unit.

The internal-combustion engine of the working machine has a throttle valve controlling the engine output, the throttle valve being disposed in a mixture passage of the carburetor. The engine is designed so as to stably rotate at a lower RPM than the clutch-in RPM when the throttle valve is in its fully-closed position. The fully-closed state of the throttle valve is called "idle state".

As to the engine startup, in the case of starting the engine when the engine is cool (so called "cold start"), it is general that the throttle valve is set half open. That is, by setting the throttle valve half open, the engine can be started with the increased amount of air (air-fuel mixture) fed to the engine. This can prevent the engine from stopping immediately after the engine starts. In other words, the reliability in the engine startup can be enhanced. The half-open state of the throttle vale is called "first idle state". The engine can promptly be started by performing the engine startup operation in the first idle state.

In the case of starting the engine in the first idle state, however, the engine RPM exceeds the clutch-in RPM, with the result that the centrifugal clutch becomes engaged. When the centrifugal clutch becomes engaged, the operating unit abruptly acts. This operating unit action is unfavorable in terms of ensuring the worker's safety.

The working machine includes a brake system so that the operating unit can be braked by the brake system. For the purpose of ensuring the worker's safety in starting the engine, it is recommended to perform the engine startup operation with the brake system being activated. At the time of startup in the first idle state, in particular, the startup operation using the activated brake is strongly recommended to prevent the engine RPM from being higher than the clutch-in RPM.

It is left up to the worker's decision whether to turn on the brake at the engine startup. In case, for example, the worker performs the startup operation without using the brake system in the first idle state, the operating unit may act simultaneously with the engine startup. Since this operating unit action is an action unintended by the worker, it is desirable to provide the working machine with a means preventing the operating unit from acting at the engine startup.

In order to prevent the operating unit from acting at the engine startup, the working machine provided with a blade (s) or a cutter(s) in particular includes a control means having an RPM suppression mode. The RPM suppression mode has a function of inhibiting the engine RPM from exceeding the clutch-in RPM after the engine startup.

The instant that the internal-combustion engine starts, the RPM suppression mode begins action. In the RPM suppression mode, the engine RPM continues to be detected. When the started engine RPM is higher than the clutch-in RPM or when expected to become higher than the clutch-in RPM (i.e. when the engine RPM exceeds a predetermined RPM lower than the clutch-in RPM for example), control suppressing the engine RPM is executed. Examples of the engine RPM suppressing control can include misfire control thinning out the firing of the ignition device, ignition timing control considerably retarding the ignition timing, and air-fuel ratio control increasing the amount of the fuel component in the air-fuel mixture supplied to the engine.

The RPM suppression mode needs to be cancelled before a worker starts the work. If certain conditions are not satisfied, however, the RPM suppression mode cannot be cancelled. Accordingly, the engine does not respond even though the worker operates the throttle lever to fully open the throttle valve prior to cancelling the RPM suppression mode. That is, regardless of the worker's operation of the throttle lever, the engine RPM is inhibited from rising under the control of the RPM suppression mode. Thus, even if the worker operates the throttle lever to perform the work when the RPM suppression mode is not yet cancelled, the worker is faced with a situation where the worker cannot perform the work since the engine does not respond.

In order to ensure the worker's safety, the RPM suppression mode is desirably executed continuously until the engine RPM becomes stable at a low RPM (an idle RPM) in the state where the throttle valve is positioned at the idle position (closed position) with the first idle state cancelled. Thus, from the viewpoint of the safety, it is preferable to impose strict conditions as the RPM suppression mode cancelling conditions.

On the other hand, the RPM suppression mode needs to be cancelled before a worker operates the throttle lever to start the work. In other words, it is desirable to cancel the RPM suppression mode as early as possible. Thus, from the viewpoint of the workability, it is preferred that loose conditions be imposed as the RPM suppression mode cancelling conditions.

Patent Document 1 discloses cancelling the RPM suppression mode when a worker fully opens a throttle valve after the startup of the engine.

Patent Document 2 proposes cancelling the RPM suppression mode by detecting that the engine operation state has become idle after a worker fully closes the throttle valve to end the first idle state. That is, in Patent Document 2, the RPM suppression mode is cancelled by detecting that a time has elapsed enough for the engine to become stable at the idle RPM as a result of reduction in the engine RPM with the return of the throttle valve to the fully closed state by the worker.

[Patent Document 1] U.S. Pat. Application Publication No. 2012/0193112

[Patent Document 2] U.S. Pat. No. 7,699,039

As disclosed in Patent Document 1, it may be a preferred technique from the viewpoint of the operability that the RPM suppression mode is cancelled when a worker performs the operation opening the throttle valve. To securely detect the fully-opened state of the throttle valve, however, there is a need for e.g. a mechanical switch acting in response to the worker's operation to open the throttle valve or a sensor for detecting the fully opened state of the throttle valve. For example, employment of the mechanical switch leads to an increased cost of the working machine.

Patent Document 2 discloses a technique causing software to accurately execute a cancelation of the RPM suppression mode without using hardware like the mechanical switch. The technique disclosed in Patent Document 2, however, employs a condition that the engine RPM becomes stable at the idle RPM, as the RPM suppression mode cancelling conditions. As a result, the RPM suppression mode is executed until the internal-combustion engine RPM reaches the stable idle RPM. At the engine startup, however, a relatively long time may elapse before the engine RPM becomes stable at the idle RPM.

For example, if the engine RPM does not rise even though the worker operates the throttle lever to fully open the throttle valve for the purpose of starting the work, the worker will fall into an inexplicable feeling on why the engine RPM does not rise. The worker may think that some sort of hindrance occurs in cooperation between the throttle lever and the throttle valve, and may operate the throttle lever again and again. With the worker's opening operation of the throttle lever, the throttle valve opens and an excessive air-fuel mixture is supplied to the carburetor mixture passage.

The air-fuel mixture excessively supplied to the mixture passage acts so as to raise the engine RPM. The rise of the engine RPM not only activates the RPM suppression mode so that the engine RPM suppressing control is executed, but also delays more and more the timing to cancel the RPM suppression mode. In other words, the more the worker operates the throttle lever, the longer the RPM suppression mode continues, with the result that the cancelation of the RPM suppression mode is delayed increasingly. In consequence, the worker may not be able to work no matter how much time passes.

SUMMARY OF THE INVENTION

An object of the present invention is to provide a working machine having an RPM suppression mode to ensure a worker's safety at the time of engine startup, the working machine being capable of meeting both a request to ensure the worker's safety at the engine startup and a worker's request to start the work promptly.

Another object of the present invention is to provide the working machine capable of optimizing cancelation conditions for cancelling the engine RPM suppression mode.

According to the present invention, the technical problem described above is solved by a working machine (1) having a centrifugal clutch (6) between an internal combustion engine (2) and an operating unit (4) with a blade(s) or a cutter(s), the working machine providing control of preventing the rotation number of the internal combustion engine (2) from exceeding a clutch-in rotation number in an engine rotation number suppression mode executed at the start of the internal combustion engine (2) so as to inhibit the centrifugal clutch from entering an engaged state, the working machine comprising:

a mode cancelling means (S5, S12, S32) canceling the engine rotation number suppression mode when a predetermined mode cancelation condition for cancelling the engine rotation number suppression mode is satisfied; and a cancelation condition changing means (S2, S15, S34) changing the mode cancelation condition depending on a change in an engine operational state and/or an environment.

Further objects and operative effects of the present invention will become apparent from the following detailed description of embodiments of the present invention.

DETAILED DESCRIPTION OF THE PRESENT INVENTION

Figure 1:
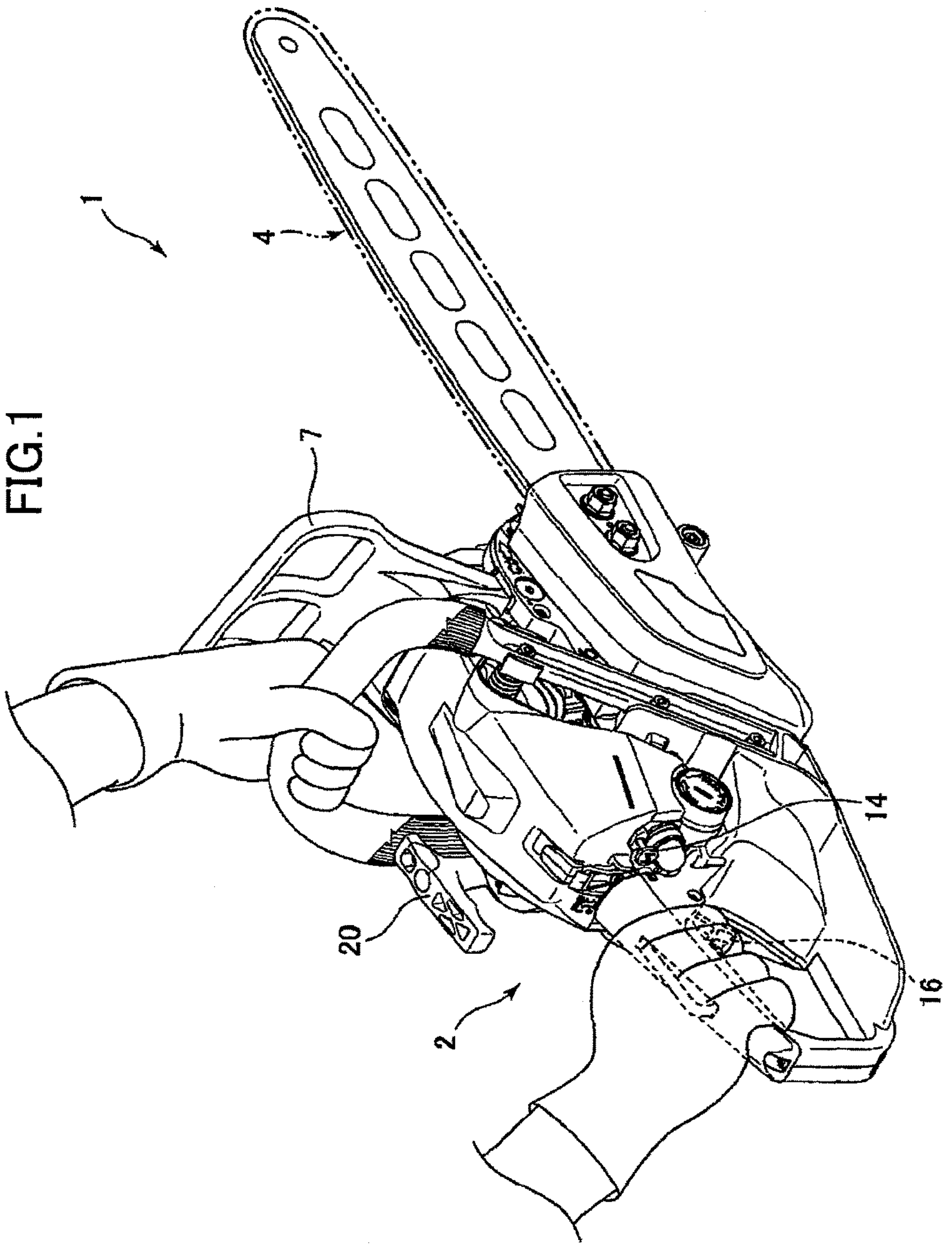
FIG. 1 shows a perspective diagram of a chain saw.
Figure 2:
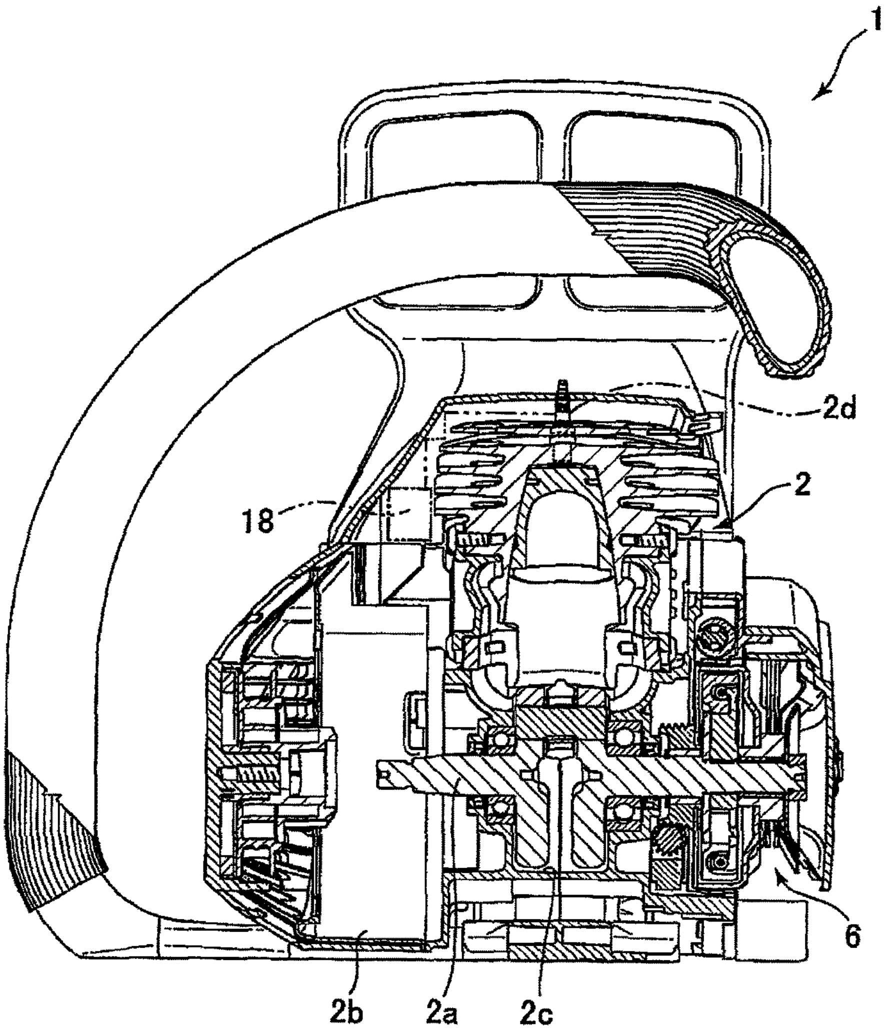
FIG. 2 shows a sectional diagram of a driving unit of the chain saw.

Referring to FIGS. 1 and 2, description will be given of a chain saw that is an engine-driven working machine to which the present invention is applicable. Reference numeral 1 denotes the chain saw. The chain saw 1 includes an internal-combustion engine, a chain with cutters for acting as an operating unit 4 driven by the internal-combustion engine 2, and a centrifugal clutch 6 (FIG. 2) disposed between the internal-combustion engine 2 and the operating unit 4. When the internal-combustion engine 2 has an RPM higher than a predetermined clutch-in RPM (e.g. 4,800 rpm), the centrifugal clutch 6 couples the internal-combustion engine 2 and the chain with cutters 4 together to transmit power of the internal-combustion engine 2 to the chain 4.

The chain saw 1 has a brake lever 7 (FIG. 1). By operating the brake lever 7, the worker can activate a brake (not shown) braking the output side of the centrifugal clutch 6. That is, by turning the brake lever 7 on, the brake is engaged so that the output side of the centrifugal clutch 6 can compulsorily be stopped from rotating. Configurations and functions of the engine 2, the chain with cutters 4, the centrifugal clutch 6, and others of the chain saw 1 are the same as those in the prior art and therefore will not again be detailed.

Referring in particular to FIG. 2, the internal-combustion engine 2 is preferably a two-cycle gasoline engine. The engine 2 includes a carburetor 8 that will be described with reference to FIG. 3. The carburetor 8 includes a throttle valve 10 and a choke valve 12 that are arranged in an air-fuel mixture generation passage 13. The throttle valve 10 and the choke valve 12 are positioned downstream and upstream, respectively, of the air-fuel mixture generation passage 13.

Immediately after startup of the internal-combustion engine 2, an engine RPM suppression mode is executed and engine control is executed so that the engine RPM becomes lower than the clutch-in RPM. When the imposed cancelation conditions are satisfied, the engine RPM suppression mode is cancelled. After the cancelation of the engine RPM suppression mode, the worker operates a throttle lever 16 (FIG. 1) to displace a throttle rod 30 (FIG. 3) and increases the degree of opening of the throttle valve 10 with the displacement of the throttle valve 30 to obtain an engine output corresponding to the degree of opening of the throttle valve 10.

Figure 4:
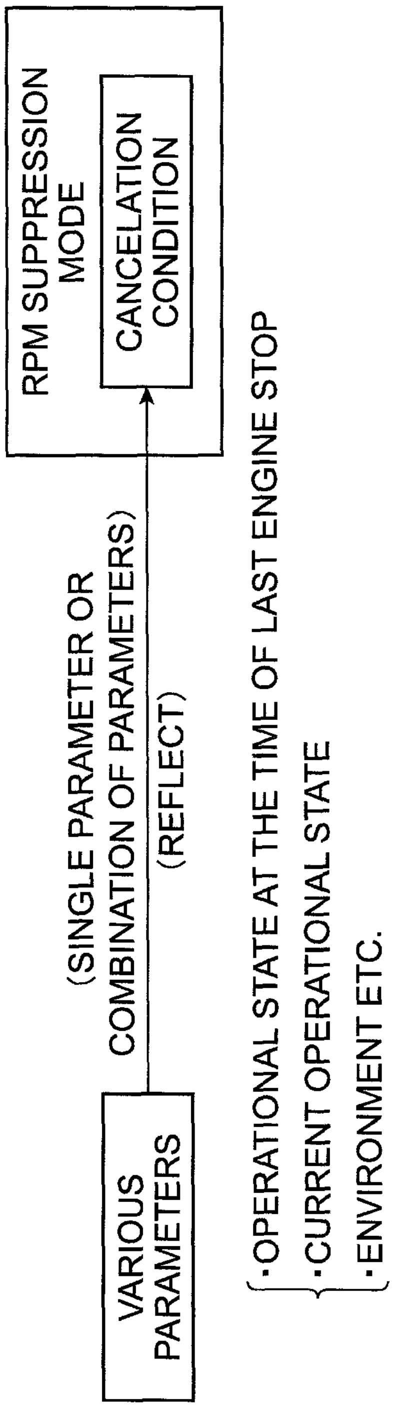
FIG. 4 shows a diagram for explaining a basic concept of the present invention.

Referring to FIG. 4, an optimum cancelation condition corresponding to various parameters is set as a cancelation condition for the engine RPM suppression mode. Adoptable parameters are parameters related to an engine operational state and an environment. The adoptable parameters are exemplarily listed as follows:

(1) an engine temperature;

(2) the engine RPM, an acceleration of the engine RPM, a slope of change in the engine RPM;

(3) a fluctuation amount (amplitude) of the engine RPM in a certain period;

(4) an average value of the engine RPM in a certain period;

(5) an intake air temperature (outside air temperature);

(6) an inlet air pressure;

(7) an opening degree of the choke valve 12 (the opening degree of the choke valve 12 can be detected by a choke valve position sensor, a full-open detection switch, etc.);

(8) an opening degree of the throttle valve 10 (the opening degree of the throttle valve 10 can be detected by a throttle valve position sensor, a full-open detection switch, etc.);

(9) a flow rate of a fuel-air mixture supplied to the fuel-air mixture generation passage 13 of the carburetor 8 (e.g., in the case of an electronically controlled carburetor, information on a flow rate of the supplied fuel-air mixture can be obtained from a control amount thereof);

(10) a cylinder inner pressure;

(11) a pressure inside the crankcase 2*c* (FIG. 2);

(12) an exhaust gas pressure;

(13) an exhaust gas temperature; and

(14) the number of times that a recoil rope 20 (FIG. 1) is pulled up for the engine start.

The cancelation condition of the engine RPM suppression mode is changed, for example, due to the following factors:

(a) an elapsed time from predetermined timing such as an engine start;

(b) an elapsed time from entry into a transition state described later;

(c) a fluctuation cycle of the engine RPM in a certain period;

(d) a frequency of rising peaks of the engine RPM in a certain period; and (e) a frequency of falling peaks of the engine RPM in a certain period.

Based on one or more factors of (a) to (e) described above, the cancelation condition of the engine RPM suppression mode is changed to optimize the mode cancelation condition.

Figure 5:
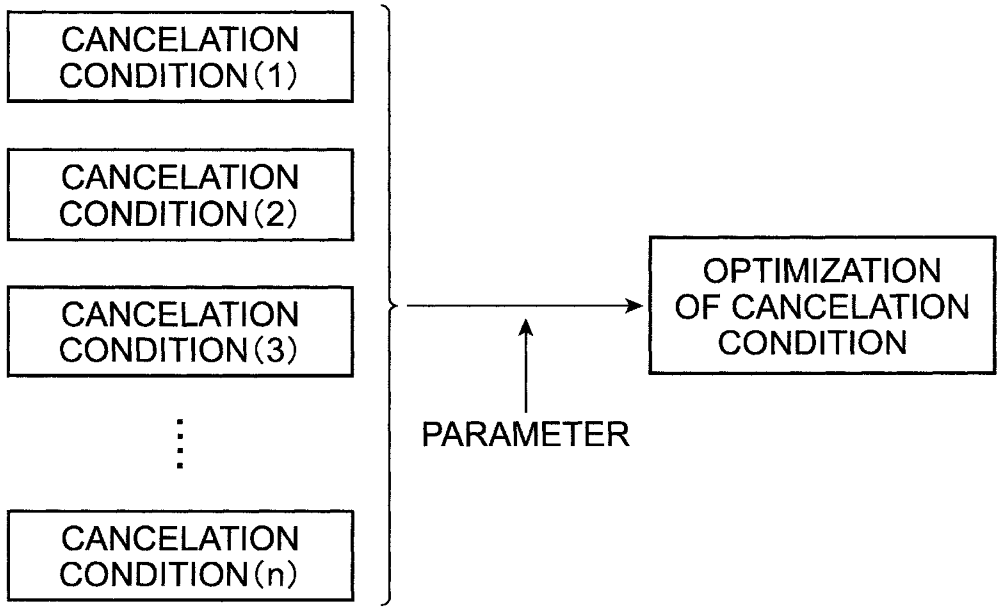
FIG. 5 shows a diagram for explaining an example preparing a plurality of mode cancelation conditions in advance in setting of conditions for cancelling the RPM suppression mode.
Figure 6:
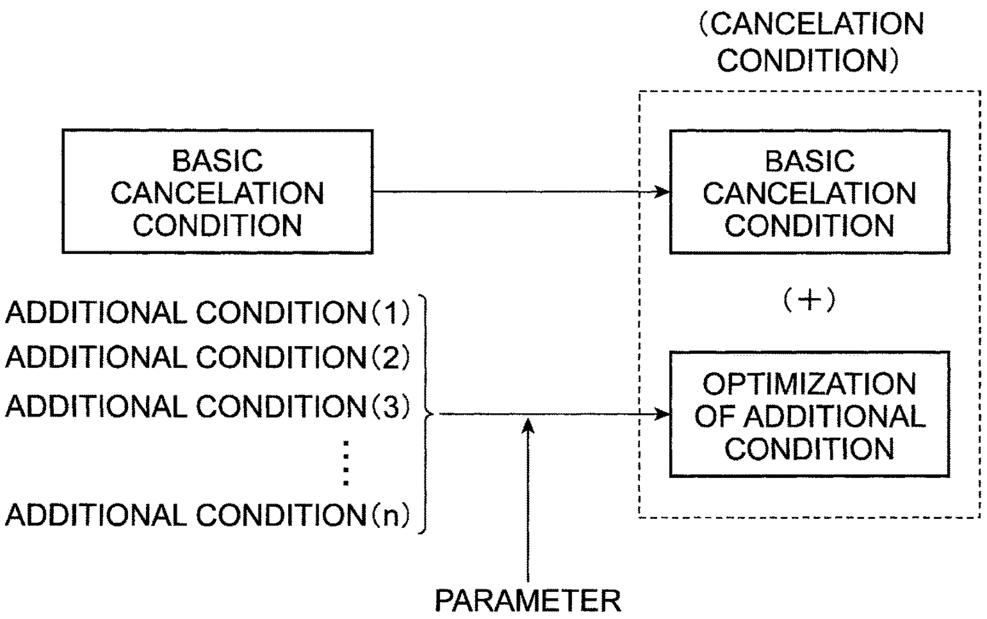
FIG. 6 shows a diagram for explaining an example combining basic cancelation conditions with additional cancelation conditions in setting of the conditions for cancelling the RPM suppression mode.

For example, as depicted in FIG. 5, the mode cancelation condition may be optimized by selecting from a plurality of cancelation conditions (n) prepared in advance. In a modification example, as shown in FIG. 6, a basic mode cancelation condition and a plurality of cancelation conditions may be prepared so as to select one or more additional conditions. In the case of FIG. 6, the mode cancelation condition to be set is made up of a condition group consisting of a combination of a basic cancelation condition and one or more additional requirements or is made up only of the basic cancelation condition.

As described above, the engine RPM suppression mode is cancelled when a predetermined mode cancelation condition is satisfied. The mode cancelation condition is optimized in accordance with various parameters. Therefore, as can be seen from a function block diagram of FIG. 4, the engine RPM suppression mode can be comprehended as a concept including the mode cancelation condition.

A specific form of the present invention includes (1) optimization of the mode cancelation condition at the engine start and (2) optimization of the mode cancelation condition after the engine start. The optimization of the mode cancelation condition after the engine start of the above (2) includes two examples. In the first example, an engine operational state after cancelation of the engine RPM suppression mode is monitored to restart the engine RPM suppression mode as needed. In the second example, the mode cancelation condition is changed during execution of the engine RPM suppression mode so that the mode cancelation condition is sequentially optimized.

First Form (First Example, FIG. 7):

A first form (FIG. 7) will hereinafter be referred to as a "first example". In the first example, at least two modes are prepared in advance as the engine RPM suppression mode executed at the engine start. In other words, at least two mode cancelation conditions are prepared in advance. For example, if the engine RPM suppression mode has three modes, a first mode (first mode cancelation condition), a second mode (second mode cancelation condition), and a third mode (third mode cancelation condition) are selected based on a state at the time of the last engine stop.

Therefore, in the first example (FIG. 7), typically, the state of the engine at the time of the last engine stop is reflected on the control (the mode cancelation condition) of the current engine RPM suppression mode. Obviously, based on the engine temperature at the engine start, the engine RPM suppression mode corresponding to this engine temperature may be set. For example, when the engine is completely cooled, it can be expected that time is required for stabilizing an engine operational state at the engine start and, therefore, the engine RPM suppression mode with a strict mode cancelation condition may be set.

The parameters (1) to (14) described above are parameters at the time of the last engine stop. For example, the parameter (3), i.e., the fluctuation amount (amplitude) of the engine RPM in a certain period, is the fluctuation amount of the engine RPM in a predetermined period immediately before the engine was stopped last time. From the fluctuation amount of the engine RPM, for example, it can be estimated whether fuel in a fuel tank is depleted. Similarly, from (8) the opening degree of the throttle valve 10, for example, it can be estimated whether fuel in the fuel tank is depleted.

If information on the operational state at the time of the last engine stop, for example, stored in a memory 26 (FIG. 10), is significantly different from information on the current operational state, a possibility of an environmental change exists and, therefore, the cancelation condition of the engine RPM suppression mode may be made strict. For example, if a significant difference exists in the outside air temperature, the engine temperature, the inlet air pressure, the average value of the engine RPM, etc. between the last engine stop and the current state, it can be presumed that a working environment has changed. The change in the working environment is exemplified as follows:

(1) a change in the working environment from a low altitude (high altitude) to a high altitude (low altitude);
(2) a change in the working environment from a low temperature (high temperature) to a high temperature (low temperature);
(3) refueling to an empty fuel tank; and
(4) a change in quality or type of fuel.

Based on at least one of these parameters, any of the first to third modes is selected (S2 of FIG. 7), and this selected mode is executed (S3).

For example, any of the first to third modes is selected based on a large, medium, or small flow rate of a fuel-air mixture supplied to the fuel-air mixture generation passage 13 of the carburetor 8 at the time of the last engine stop. The first to third modes (the first to third mode cancelation conditions) have a difference in whether the condition for canceling the engine RPM suppression mode is strict or loose.

For example, in the case of a "large" flow rate of the fuel-air mixture at the time of the last engine stop, a large amount of the fuel-air mixture remains in the fuel-air mixture generation passage 13 of the engine 2. Therefore, at the current engine start, the engine 2 has a fluctuation range made smaller, resulting in a higher possibility of erroneous mode cancelation. Therefore, the first mode (the first mode cancelation condition) is selected because of a strict condition for cancelling the engine RPM suppression mode.

In the case of a "small" flow rate of the fuel-air mixture at the time of the last engine stop, it can be expected that a comparatively small amount of the fuel-air mixture remains in the fuel-air mixture generation passage 13 of the engine 2. Therefore, at the current engine start, the engine 2 tends to have a relatively large fluctuation range of the engine RPM. A large fluctuation reduces the possibility of the erroneous mode cancelation. Therefore, the third mode (the third mode cancelation condition) is selected because of a loose condition for cancelling the engine RPM suppression mode.

In the case of a "medium" flow rate of the fuel-air mixture at the time of the last engine stop, it can be expected that a relatively "medium" amount of the fuel-air mixture remains in the fuel-air mixture generation passage 13 of the engine 2. Therefore, at the current engine start, the engine 2 tends to have a relatively slightly large fluctuation range of the engine RPM. Therefore, the second mode (the second mode cancelation condition) is selected because the condition for cancelling the engine RPM suppression mode is relatively on the medium level.

Figure 8:
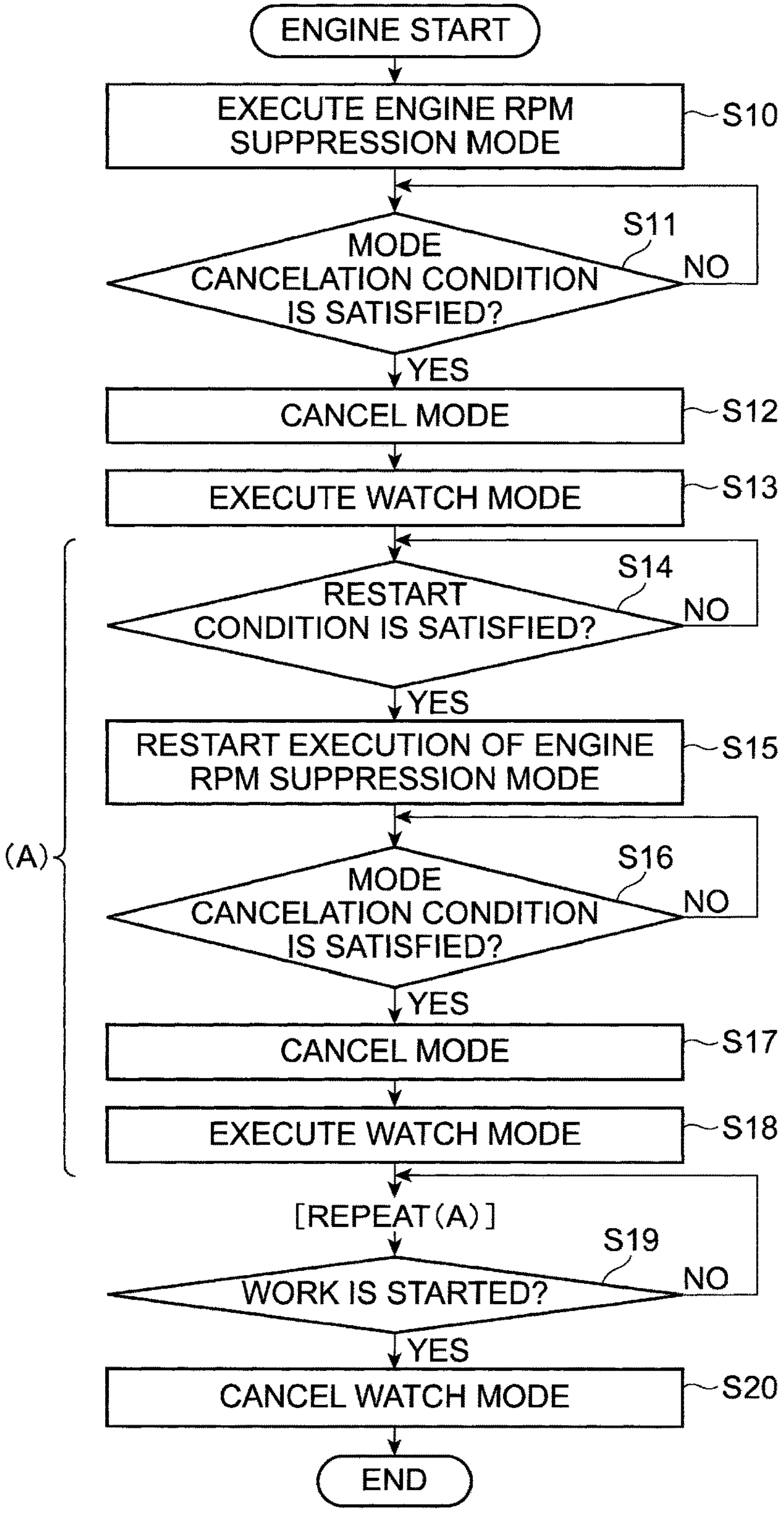
FIG. 8 shows a flow diagram for explaining a first method (a second example) of a second embodiment for optimization of the mode cancelation conditions.

First Method of Second Form (Second Example, FIG. 8):

A first method of a second form (FIG. 8) will hereinafter be referred to as a "second example". In the second example, as is the case with the first example, the engine RPM suppression mode is executed at the engine start (S10 of FIG. 8). When the mode cancelation condition is satisfied, the engine RPM suppression mode is cancelled as in the conventional cases (S11, S12 of FIG. 8). In the second example, a watch mode of continuously monitoring a predetermined parameter is executed when the engine RPM suppression mode is canceled (S13 of FIG. 8). Based on information acquired during execution of the watch mode, if the engine is in an unstable operational state and the engine RPM is highly likely to exceed the clutch-in RPM or the RPM higher than the clutch-in RPM is likely to continue for a predetermined time, the engine RPM suppression mode is executed again (S14, S15 of FIG. 8). The cancelation of the engine RPM suppression mode, the watch mode, the re-execution of the engine RPM suppression mode, and the re-cancelation of the engine RPM suppression mode may be repeated as needed. Preferably, when the RPM suppression mode is restarted, the mode cancelation condition may be changed. The cancelation condition may be changed such that the mode cancelation condition is made looser. In particular, the mode cancelation condition may be changed such that the RPM suppression mode is more easily canceled for each restart.

For example, if the engine RPM suppression mode of the first time executed at the engine start has the cancelation condition reflecting the parameter at the time of the last engine stop as is the case with the first example (FIG. 7), the cancelation condition of the preceding engine RPM suppression mode may be the same as the cancelation condition of the next engine RPM suppression mode.

Regardless of whether the cancelation condition of the engine RPM suppression mode of the first time reflects the parameter at the time of the last engine stop, preferably, the cancelation condition of the preceding engine RPM suppression mode may be different from the cancelation condition of the next engine RPM suppression mode. When a first cancelation condition of the preceding engine RPM suppression mode and a second cancelation condition of the next engine RPM suppression mode are differentiated from each other, the second cancelation condition may be a loosened condition, i.e., a condition on which the engine RPM suppression mode is more easily canceled, as compared to the first cancelation condition.

According to the second example (FIG. 8), the engine RPM suppression mode of the first time is executed at the engine start (S10 of FIG. 8) and, when the cancelation condition of this engine RPM suppression mode is satisfied, the engine RPM suppression mode is cancelled and the watch mode is executed (S11 to S13). If it is determined based on the information acquired through the execution of the watch mode that the engine RPM suppression mode should be executed again (S14), the engine RPM suppression mode of the second time is executed (S15) and, when the cancelation condition of the engine RPM suppression mode of the second time is satisfied (S16), the engine RPM suppression mode of the second time is canceled (S17) and the watch mode is executed (S18).

The watch mode is canceled when the worker starts a work, for example. For example, the fully-opened state of the throttle valve 10 can be detected based on the detected engine information, so as to cancel the watch mode based on the detection of the fully-opened state.

Other examples related to the cancelation of the watch mode are listed as follows.

(1) After the engine RPM suppression mode is cancelled, if the engine RPM is kept within a certain range for a certain period, the watch mode is canceled. In other words, if the engine RPM does not increase or decrease by a certain amount, the watch mode is canceled.
(2) If the engine RPM is continuously in a state of not exceeding the clutch-in RPM for a certain time, the watch mode is canceled.
(3) If the number of times of non-execution of the engine RPM suppression control reaches a predetermined number of times, the watch mode is canceled.
(4) If the engine RPM corresponding to the engine operational state being in a half-throttle region (from the clutch-in RPM to the engine RPM at the time of full-throttle) is not continued for a predetermined time, the watch mode is canceled.

The engine RPM suppression mode of the first time and the engine RPM suppression mode of the second time may have common control details on the engine RPM suppression except different mode cancelation conditions. The engine RPM suppression mode of the first time and the engine RPM suppression mode of the second time may include the engine RPM suppression control different from each other.

Second Method of Second Form (Third Example, FIG. 9):

A second method of the second form (FIG. 9) will hereinafter be referred to as a “third example”. In the third example, the cancelation condition of the engine RPM suppression mode is sequentially changed depending on an elapsed time from predetermined timing such as an engine start or a change in the engine state over time (S34 of FIG. 9), so as to loosen the cancelation condition.

The engine instability immediately after the start of the internal combustion engine 2 occurs due to various factors. This instability diminishes over time. The optimum timing of cancelation of the engine RPM suppression mode varies each time. Therefore, the timing of cancelation of the RPM suppression mode is not constant. The engine RPM often has an instable fluctuation range immediately after the engine start. Therefore, the mode cancelation condition is preferably be made strict immediately after the engine start by adding additional conditions to the condition for cancelling the RPM suppression mode. By reducing the additional cancelation conditions or loosening the cancelation condition depending on an elapsed time from the engine start or a change in the operational state, the RPM suppression mode can be canceled at appropriate timing.

Figure 9:
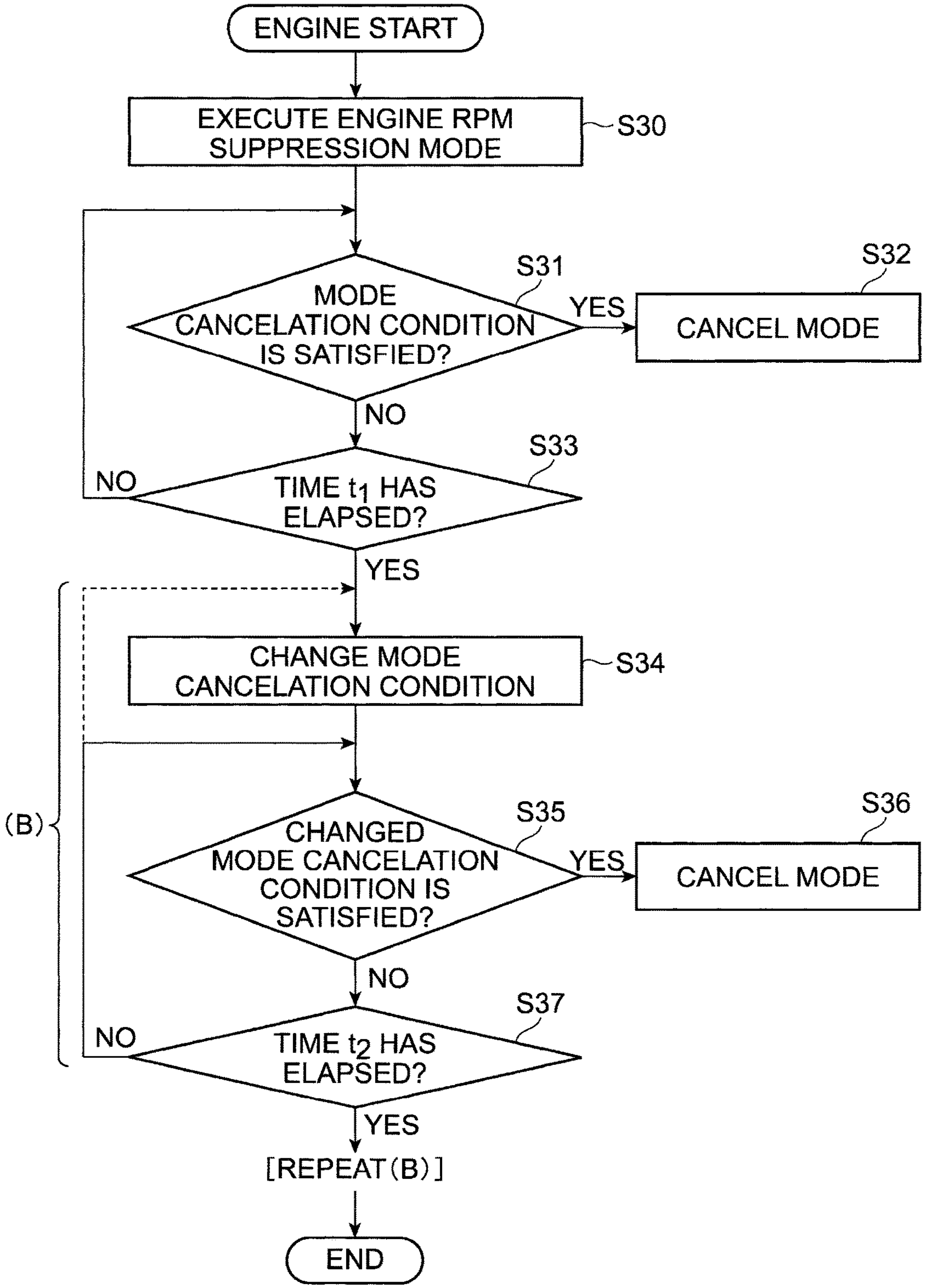
FIG. 9 shows a flow diagram for explaining a second method (a third example) of the second embodiment for optimization of the mode cancelation conditions.

The condition for canceling the engine RPM suppression mode may typically or conveniently be changed based an elapsed time from the engine start (S33, S37 of FIG. 9). In a modification example, for example, when the recoil rope 20 (FIG. 1) is pulled up for the engine start a predetermined number of times, the mode cancelation condition is reset to make the mode cancelation condition strict. As the pull-up operation of the recoil rope 20 is performed, the fuel-air mixture is sucked into the fuel-air mixture generation passage 13 of the engine 2. As a result, the fuel-air mixture possibly excessively remains in the fuel-air mixture generation passage 13, and the concentration of the fuel-air mixture in the fuel-air mixture generation passage 13 becomes unknown. Therefore, the mode cancelation condition is preferably made strict.

Although the three methods of optimizing the mode cancelation condition for cancelling the engine RPM suppression mode have been described, these three method may be combined with each other. As described above, in the first example (FIG. 7), the last engine state is reflected on the current engine RPM suppression mode (particularly on the mode cancelation condition). In the second example (FIG. 8), the engine operational state is monitored in the watch mode after the engine RPM suppression mode is cancelled and, if it is determined in the watch mode that the engine operational state is still unstable, the engine RPM suppression mode is restarted and the mode cancelation condition is reset. In the third example (FIG. 9), the cancelation condition of the engine RPM suppression mode is loosened in stages depending on an elapsed time from the engine start or a change in the engine operational state.

The combinations of the three methods are exemplarily listed as follows.

Figure 7:
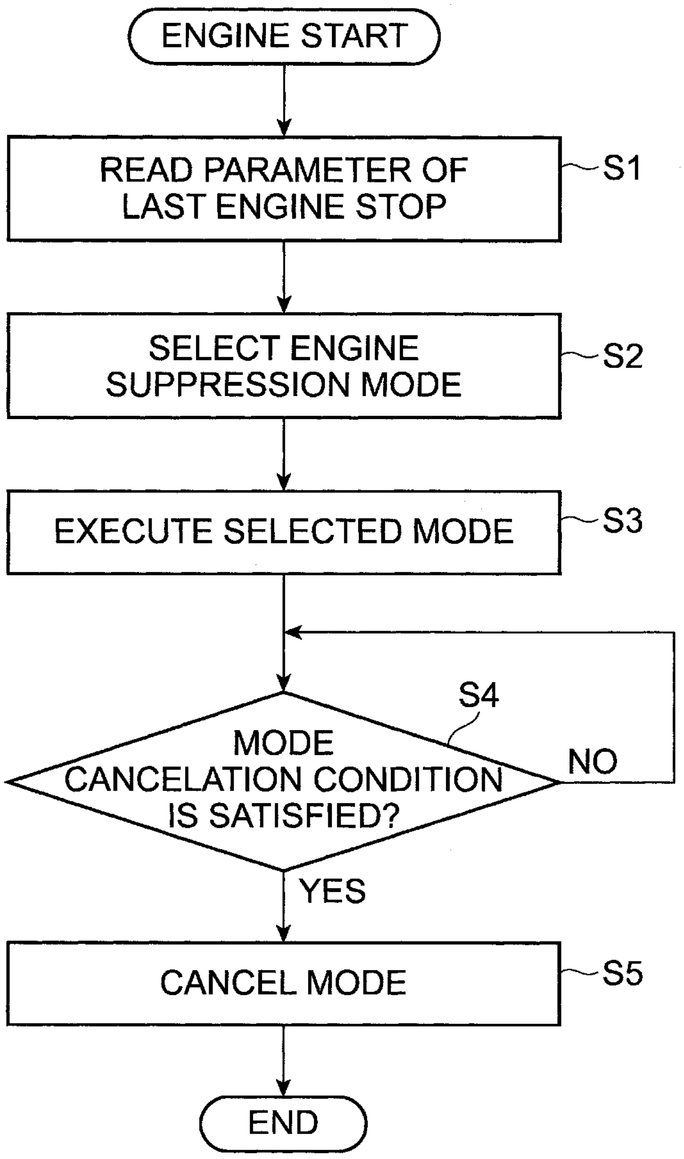
FIG. 7 shows a flow diagram for explaining a first embodiment (a first example) for optimization of the mode cancelation conditions.

(1) Combination of First Example (FIG. 7) and Second Example (FIG. 8):

In the second example (FIG. 8), the engine RPM suppression mode reflecting the last engine state may be executed at the engine start in accordance with the teaching of the first example (FIG. 7).

(2) Combination of First Example (FIG. 7) and Third Example (FIG. 9):

In the third example (FIG. 9), the engine RPM suppression mode reflecting the last engine state may be executed at the engine start in accordance with the teaching of the first example (FIG. 7).

(3) Combination of second Example (FIG. 8) and Third Example (FIG. 9):

In the second example (FIG. 8), in comparison between the engine RPM suppression mode of the first time executed at the engine start and the engine RPM suppression mode of the second time reset through the watch mode subsequent to the cancelation of this RPM suppression mode, for example, the cancelation condition in the RPM suppression mode of the first time and the cancelation condition of the RPM suppression mode of the second time may be differentiated from each other in accordance with the teaching of the third example (FIG. 9), and the cancelation condition of the RPM suppression mode of the second time may relatively be loosened. The same applies to the cancelation conditions of the RPM suppression modes of the second time and the next third time, and the cancelation condition of the RPM suppression mode of the third time may relatively be loosened.

(4) Combination of First to Third Examples (FIGS. 7 to 9):

In the second example (FIG. 8), for the engine RPM suppression mode of the first time executed at the engine start, the RPM suppression mode reflecting the state of the internal combustion engine 2 at the time of the last engine stop is set in accordance with the teaching of the first example (FIG. 7).

In comparison with the engine RPM suppression mode of the second time reset through the watch mode subsequent to the cancelation of this RPM suppression mode, for example, the cancelation condition in the RPM suppression mode of the first time and the cancelation condition of the RPM suppression mode of the second time may be differentiated from each other in accordance with the teaching of the third example (FIG. 9), and the cancelation condition of the RPM suppression mode of the second time may relatively be loosened. The same applies to the cancelation conditions of the RPM suppression modes of the second time and the next third time, and the cancelation condition of the RPM suppression mode of the third time may relatively be loosened as compared to the second time.

Figure 3:
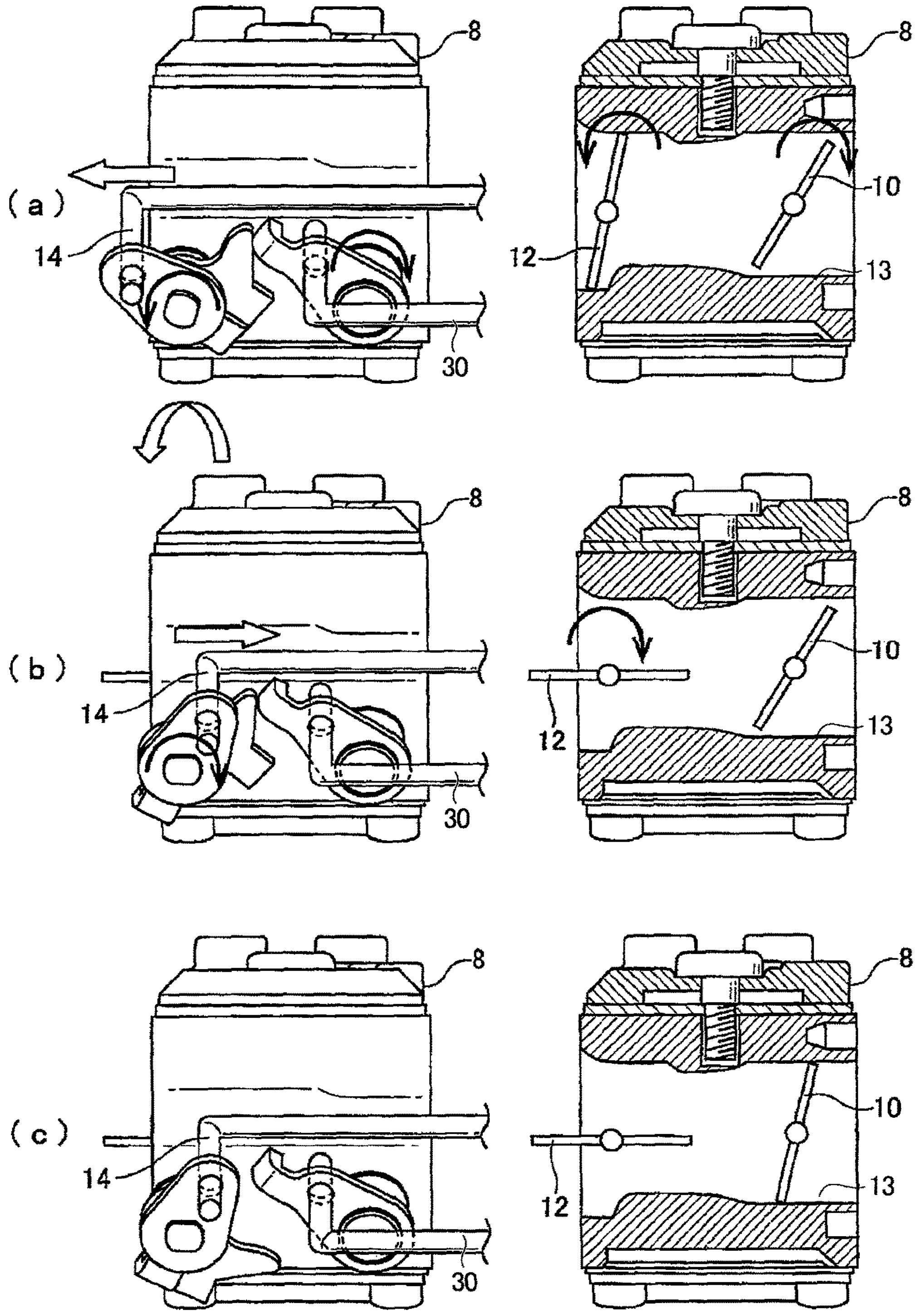
FIG. 3 shows a diagram for explaining the cooperation between a throttle valve and a choke valve.

A form of the present invention will hereinafter be described based on a typical example of an engine start method. FIG. 3 is a diagram for explaining a linkage between the throttle valve 10 and the choke valve 12 included in the carburetor 8. Referring to FIG. 3, the throttle valve 10 and the choke valve 12 may be configured to operate independently of each other or may be configured to operate in association with each other for a certain operation. The carburetor 8 shown in FIG. 3 is configured such that an operation of the choke lever 14 (FIG. 1) changes the choke valve 12 from a fully-opened position to a fully-closed position and the throttle valve 10 from a fully-closed position to a half-opened position (FIG. 3(*a*)).

When the worker returns the choke lever 14, the choke valve 12 is changed from the fully-closed position to the fully-opened position, while the throttle valve 10 maintains the half-opened position (FIG. 3(*b*)). When the worker operates the throttle lever 16 (FIG. 1) to return the throttle lever 16 to an original position, the throttle valve 10 returns from the half-opened position to the fully-closed position (FIG. 3(*c*)).

The internal combustion engine 2 has a control device 18 (FIG. 2) controlling the engine RPM. In this embodiment, a magnet (integrated with a flywheel) 2*b* (FIG. 2) is attached to a crankshaft 2*a* of the internal combustion engine 2, and the magnet 2*b* forms a portion of an RPM sensor detecting the engine RPM of the engine 2. For example, a time required for one rotation of the crankshaft 2*a* (a crankshaft cycle) of the engine 2 is detected, and a program process of the crankshaft cycle is executed to calculate the engine RPM.

Figure 10:
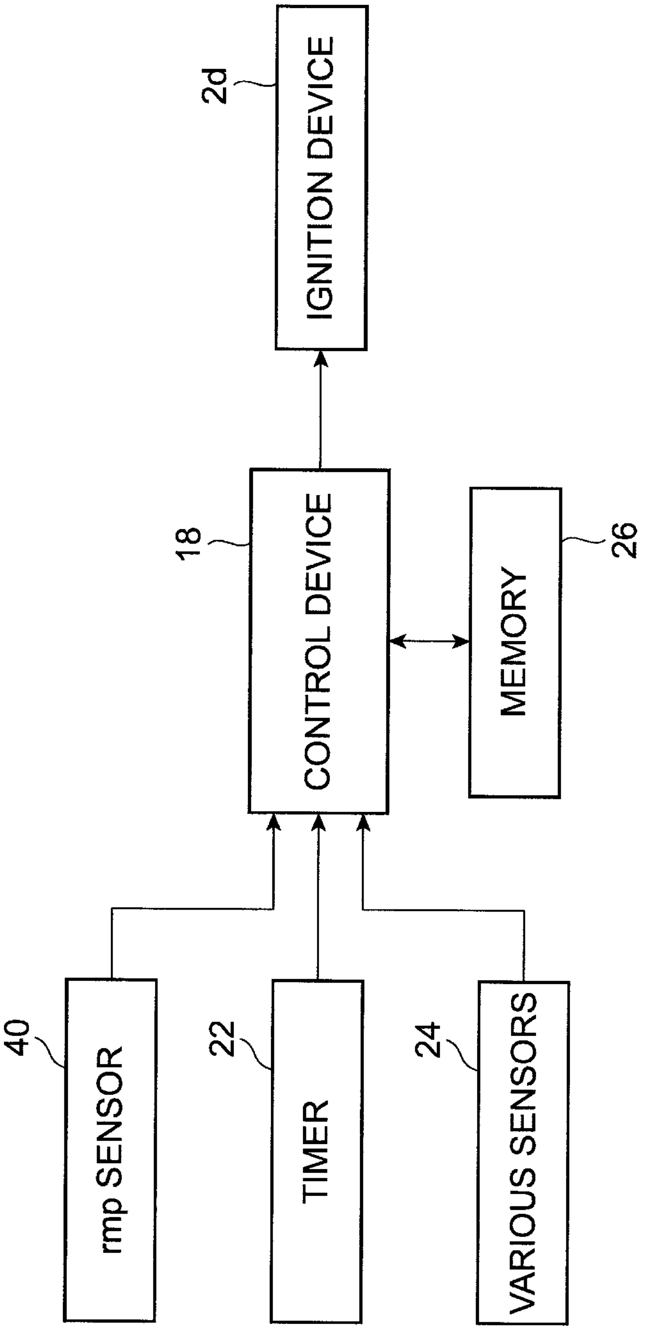
FIG. 10 shows a block diagram of control system related to the engine RPM suppression mode and cancelation thereof.

A typical starting method of the internal combustion engine 2 and the engine RPM suppression mode executed at the start will be described. FIG. 10 is a functional block diagram of elements related to the execution of the engine RPM suppression mode.

Referring to FIG. 10, the control device 18 described above is generally made up of a microcomputer. To the control device 18, signals are input from an RPM (rpm) sensor 40 including the magnet 2*b* for detecting the engine RPM, a timer 22, and other various sensors 24. The control device 18 controls an ignition device 2*d*. The sensors 40, 24 have a meaning not limited to a component having a function in itself The case of generating information through the arithmetic processing by the control device 18 is also included.

Referring to FIG. 3, the choke lever 14 is operated to move the choke valve 12 from the fully-opened position to the fully-closed position and the throttle valve 10 to the half-opened position (FIG. 3(*a*)). This is referred to as a "first-idle start" and particularly effective for a cold start when the engine 2 is cold. Subsequently, the recoil rope 20 (FIG. 1) is pulled to start the engine 2. Since the choke valve 12 is at the fully-closed position, when a negative pressure is generated inside the crankcase 2*c* (FIG. 2), the fuel-air mixture is supplied in large amount, resulting in an easily combusting state. When the recoil rope 20 is pulled several times and an initial explosion is heard, it can be known that the engine 2 enters a combustible state.

Subsequently, the choke lever 14 is returned. As a result, the choke valve 12 is positioned at the fully-opened position. The throttle valve 10 is maintained at the half-opened position (see FIG. 3(*b*)). The recoil rope 20 is then pulled to start the engine 2. Since the throttle valve 10 is at the half-opened position, the engine 2 is operated in a "first-idle state".

In the "first-idle state" in which the internal combustion engine 2 is operated with the throttle valve 10 of the internal combustion engine 2 kept at the half-opened position, the RPM suppression mode is executed from the start of the internal combustion engine 2, inhibiting the internal combustion engine 2 from rotating at the RPM higher than the clutch-in RPM. Specifically, when the RPM of the internal combustion engine 2 exceeds a predetermined RPM (e.g., 3,200 rpm) lower than the clutch-in RPM (e.g., 4,800 rpm), ignition timing control is provided to significantly delay the ignition timing. As a result, the RPM of the engine 2 can be inhibited from increasing.

Figure 11:
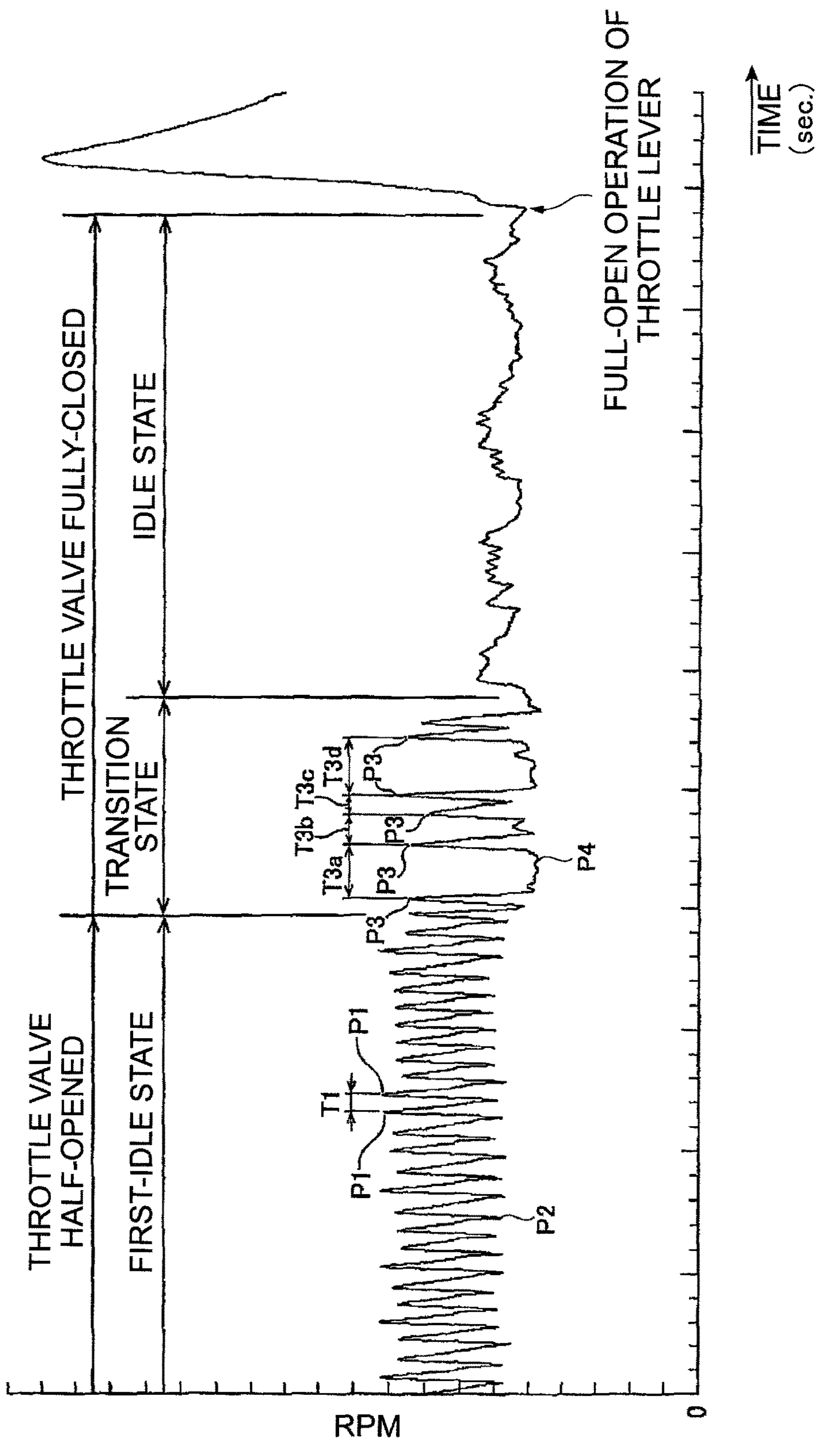
FIG. 11 shows a diagram showing a change in the engine RPM when the throttle valve shifts from its half-open position to its fully-closed position.

The cancelation of the RPM suppression mode will be described. FIG. 11 is a waveform diagram of fluctuations in the engine RPM from the engine start until the throttle valve 10 is put into the fully-opened state by the operation of the throttle lever 16 (FIG. 1). FIG. 11 is merely an example and various waveforms appear depending on a state of the internal combustion engine 2 and an environment. The RPM suppression mode is executed at the engine start.

Referring to FIG. 11, since the throttle valve 10 is at the half-opened position at the start of the internal combustion engine 2, the operational state of the internal combustion engine 2 is in the first-idle state. When a worker operates the throttle lever 16 (FIG. 1) to return the throttle lever 16 to the original position, the throttle valve 10 is changed from the half-opened position to the fully-closed position (FIG. 3(*c*)). Since the throttle valve 10 is put into the fully-closed state, the operational state of the engine 2 is shifted from the first-idle state through a transition state to an idle state.

As apparent from FIG. 11, since the RPM suppression mode is actuated in conjunction with the engine start, the engine RPM suppression control (e.g., misfire control) is provided when the engine RPM exceeds a threshold value (a predetermined RPM slightly lower than the clutch-in RPM). In FIG. 11, P1 indicates a position at which the misfire control is provided. As a result, the engine RPM in the first-idle state depicted in FIG. 11 is suppressed to an upper limit value of approx. 4,500 rpm. Since the clutch-in RPM is 4,800 rpm, the centrifugal clutch 6 is maintained in a non-engaged state. Consequently, the power transmission from the engine 2 to the operating unit 4 is interrupted by the centrifugal clutch 6. An RPM fluctuation cycle of the engine 2 in the first-idle state is shown as "T1".

It can be seen from FIG. 11 that the engine operational state significantly changes when the first-idle state is shifted to the transition state. Rising peaks of the engine RPM in the transition state are indicated by P3, and the fluctuation cycle of the engine RPM is indicated by T3*a* to T3*d*. The rising peaks P3 in the transition state in this case mean the RPM immediately before the detected engine RPM is reduced by more than a predetermined RPM (e.g., 300 rpm).

The engine RPM suppression mode is desirably canceled when the engine operational state is in the transition state. From this viewpoint, the following characteristics can be found out from the comparison between the waveform in the first-idle state and the waveform in the transition state.

(1) The RPM fluctuation cycle T3 in the transition state is larger than the RPM fluctuation cycle T1 in the first-idle state (T3>T1).

(2) In other words, the frequency of the rising peaks P3 in the transition state is lower than the frequency of the rising peaks P1 in the first-idle state. The frequency of falling peaks P4 in the transition state is lower than the frequency of falling peaks P2 in the first-idle state. The falling peaks P4 in the transition state in this case mean the RPM immediately before the detected engine RPM is increased by more than a predetermined RPM (e.g., 300 rpm).

(3) In other words, in a predetermined period, the number of the rising peaks P3 or the number of the falling peaks P4 in the transition state is smaller than the number of the rising peaks P1 or the falling peaks P2 in the first-idle state.

(4) In a predetermined period, the RPM at the rising peaks P3 in the transition state is smaller than the RPM at the rising peaks P1 in the first-idle state.

(5) In a predetermined period, the RPM at the falling peaks P4 in the transition state is smaller than the RPM at the falling peaks P2 in the first-idle state.

(6) A time interval between the two adjacent rising peaks P3, P3 in the transition state is larger than a time interval between the two adjacent rising peaks P1, P1 in the first-idle state.

(7) A time interval between the two adjacent falling peaks P4, P4 in the transition state is larger than a time interval between the two adjacent falling peaks P2, P2 in the first-idle state.

(8) In the transition state, the low engine RPM including the falling peaks P4 fluctuates in a small range.

(9) In the transition state, the RPM at the rising peaks P3 tends to decrease as time elapses.

Although not appearing on the waveform of FIG. 11, when the engine 2 is started in a cold state, the engine temperature increases as time elapses from the engine start.

Based on the characteristics as described above, by applying any one or combination of the first example (FIG. 7), the second example (FIG. 8), and the third example (FIG. 9) described above and combining several parameters, the engine RPM suppression mode can be canceled at correct timing in the transition state.

As described above, the shift from the first-idle state to the transition state is based on the operation of a worker. Therefore, if the engine is started in the first-idle state, the mode cancelation condition changing control proposed in the second example (FIG. 8) and the third example (FIG. 9) may be started from the time point of shifting from the first-idle state to the transition state.

EXPLANATIONS OF LETTERS OR NUMERALS

1 chain saw (engine-driven working machine)
2 engine
2*d* ignition device
4 chain with cutters (operating unit)
6 centrifugal clutch
8 carburetor
10 throttle valve
18 control device
26 memory

What is claimed is:

1. A working machine having a centrifugal clutch between an internal combustion engine and an operating unit with a blade, the working machine providing control of preventing the RPM of the internal combustion engine from exceeding a clutch-in RPM in an engine RPM suppression mode executed at the start of the internal combustion engine so as to inhibit the centrifugal clutch from entering an engaged state, the working machine comprising:

a mode cancelling means configured to cancel the engine RPM suppression mode when a predetermined mode cancelation condition for cancelling the engine RPM suppression mode is satisfied;

a cancelation condition changing means configured to change the mode cancelation condition depending on a change in an engine operational state detected during execution of the engine RPM suppression mode or an elapsed time;

a watch mode of monitoring the operational state of the internal combustion engine after the engine RPM suppression mode is canceled by the mode cancelling means, and a determining means configured to determine whether it is better to restart the engine RPM suppression mode based on information acquired through execution of the watch mode, wherein if the determining means determine that it is better to restart the engine RPM suppression mode, the engine RPM suppression mode is restarted.

2. The working machine according to claim 1, further comprising a memory storing an operational state at the time of an engine stop, wherein the mode cancelation condition is changed based on the engine operational state stored in the memory.

3. The working machine according to claim 1, wherein the mode cancelation condition after a change during execution of the engine RPM suppression mode is looser than the mode cancelation condition before the change.

4. The working machine according to claim 2, wherein the mode cancelation condition after a change during execution of the engine RPM suppression mode is looser than the mode cancelation condition before the change.

5. The working machine according to claim 1, wherein when a condition for canceling the watch mode is satisfied, the watch mode is cancelled.

6. The working machine according to claim 2, wherein when a condition for canceling the watch mode is satisfied, the watch mode is cancelled.

7. The working machine according to claim 1, wherein the elapsed time is an elapsed time from entry into a transition stage from a first-idle state to an idle state.

8. The working machine according to claim 1, wherein the engine operational state is a number of times that a recoil rope is pulled up for an engine start of the internal combustion engine.

9. The working machine according to claim 1, wherein the engine operational state is a fluctuation cycle of the internal combustion engine in a certain period.

10. The working machine according to claim 1, wherein the engine operational state is a frequency of rising peaks of the internal combustion engine in a certain period.

11. The working machine according to claim 2, wherein the engine operational state is a frequency of falling peaks of the internal combustion engine in a certain period.

12. A working machine having a centrifugal clutch between an internal combustion engine and an operating unit with a blade, the working machine providing control of preventing the RPM of the internal combustion engine from exceeding a clutch-in RPM in an engine RPM suppression mode executed at the start of the internal combustion engine so as to inhibit the centrifugal clutch from entering an engaged state, the working machine comprising:

a mode cancelling means configured to cancel the engine RPM suppression mode when a predetermined mode cancelation condition for cancelling the engine RPM suppression mode is satisfied;

a cancelation condition changing means configured to change the mode cancelation condition depending on a change in an engine operational state and/or an environment; and a memory storing an operational state at the time of an engine stop, wherein the mode cancelation condition is changed based on the engine operational state stored in the memory.

13. The working machine according to claim 12, wherein the mode cancelation condition is changed based on an engine operational state or time detected during execution of the engine RPM suppression mode.

14. The working machine according to claim 12, wherein the mode cancelation condition after a change during execution of the engine RPM suppression mode is looser than the mode cancelation condition before the change.

* * * * *